(12) United States Patent
Kitagawa et al.

(10) Patent No.: US 6,455,199 B1
(45) Date of Patent: Sep. 24, 2002

(54) NONAQUEOUS ELECTROLYTE SECONDARY BATTERY AND METHOD FOR MANUFACTURING NEGATIVE ELECTRODE OF THE SAME

(75) Inventors: Masaki Kitagawa, Katano; Yoshihiro Kashihara, Osaka; Hizuru Koshina, Neyagawa; Toyoji Sugimoto, Fujiidera; Kunio Tsuruta, Ikoma; Shuji Ito, Akashi; Hajime Nishino, Neyagawa; Kojiro Ishikawa, Otsu; Hisanori Sugimoto, Otsu; Kaoru Tsukamoto, Omihachiman, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/214,825
(22) PCT Filed: May 29, 1998
(86) PCT No.: PCT/JP98/02401
§ 371 (c)(1),
(2), (4) Date: Feb. 22, 1999
(87) PCT Pub. No.: WO98/54780
PCT Pub. Date: Dec. 3, 1998

(30) Foreign Application Priority Data

May 30, 1997 (JP) .............................. 9-141957

(51) Int. Cl.$^7$ .......................... C01B 31/04; H01M 4/60; H01M 4/36; H01M 6/00
(52) U.S. Cl. .................... 429/231.8; 29/623.1; 423/448
(58) Field of Search .................. 429/231.8; 252/182.1; 423/448; 29/623.1

(56) References Cited

U.S. PATENT DOCUMENTS 5,244,757 A * 9/1993 Takami et al.
5,294,498 A * 3/1994 Omaru et al.
5,587,255 A * 12/1996 Sonobe et al.
5,672,446 A * 9/1997 Barker et al.
5,756,062 A * 5/1998 Greinke et al. .......... 423/449.4
5,882,818 A * 3/1999 Fujimoto et al.
5,965,296 A * 10/1999 Nishimura et al. ...... 429/231.8
6,040,092 A * 3/2000 Yamada et al.

FOREIGN PATENT DOCUMENTS

| JP | 5-74452 | 3/1993 |
| JP | 6-168724 | 6/1994 |
| JP | 6-295725 | 10/1994 |
| JP | 7-134988 | 5/1995 |
| JP | 7-335216 | 12/1995 |
| JP | 8-213020 | 8/1996 |
| JP | 9-180720 | 7/1997 |
| JP | 9-199126 | 7/1997 |

* cited by examiner

Primary Examiner—Carol Chaney
Assistant Examiner—Tracey Dove
(74) Attorney, Agent, or Firm—Jordan and Hamburg LLP

(57) ABSTRACT

Graphite powder for a negative electrode in prior arts, which allows lithium ions to repeat intercalation and deintercalation reversibly by charge and discharge, has failed to attain a specific capacity close to the theoretical capacity of 372 mAh per 1 g. Also, there was a problem in storage property at a high temperature when it is attempted to improve the high rate charge and discharge characteristics. An object of the present invention is to solve these problems. In the process of pulverizing flaky graphite particles of which plane interval (d002) of (002) plane is 3.350 to 3.360 angstroms, and crystallite size (Lc) in the C-axis direction is at least 1000 angstroms or more, the graphite particles are chamfered into disk- or tablet-like form, which are then sifted, so as to obtain a graphite powder, of which mean particle size is defined within the range of 10 to 30 microns, mean thickness of thinnest portion is defined to be 3 to 9 microns, and X-ray diffraction peak intensity ratio of (110)/(004) by a wide angle X-ray diffraction method is defined to be 0.015 or more. By using this powder, the conventional problems are solved in a favorable balance, and, while achieving high energy density, the high rate discharge performance and reliability when left at a high temperature can be enhanced.

20 Claims, 1 Drawing Sheet

NONAQUEOUS ELECTROLYTE SECONDARY BATTERY AND METHOD FOR MANUFACTURING NEGATIVE ELECTRODE OF THE SAME

TECHNICAL FIELD

The present invention relates to a nonaqueous electrolyte secondary cell, and more particularly to a carbon material for negative electrode of a lithium ion secondary cell.

BACKGROUND ART

As a nonaqueous electrolyte secondary cell, a so-called lithium secondary cell has been hitherto studied in the interest of higher energy density by means of higher voltage and larger capacity, in which metal lithium is used as a negative electrode active material, whereas oxide, sulfide, selenide or other chalcogen compounds of transition metal, such as manganese dioxide, molybdenum disulfide or titanium selenide is used as a positive electrode active material, and organic electrolyte made of organic solvent solution of lithium salt is used as a nonaqueous electrolyte. In this lithium secondary cell, however, while an interlayer compound which exhibits relatively good charge and discharge characteristics may be selected as a positive electrode active material, the charge and discharge characteristics of metal lithium for negative electrode are not particularly excellent. Thus, the cycle life for repeating charge and discharge can hardly be extended, and moreover, there is a danger that heat generation may be caused by internal short-circuit, presenting a problem in safety. More specifically, the metal lithium in the negative electrode active material elutes into the organic electrolyte as lithium ions by discharge. When the eluted lithium ions precipitate on the surface of the negative electrode as metal lithium by charge, not all of them precipitate smoothly as in the initial state, but some precipitate as active metal crystals in the form of dendrite or moss. The active metal crystals decompose the organic solvent in the electrolyte, while the surface of the metal crystals is covered with a passive film to be inactivated, hardly contributing to discharge. As a result, as charge and discharge cycles are repeated, the negative electrode capacity declines, wherefore the negative electrode capacity had to be set extremely larger than that of the positive electrode when fabricating a cell. Besides, the active dendritic metal lithium crystals may pierce through the separator and contact with the positive electrode, possibly causing internal short-circuit. By internal short-circuit, the cell may generate heat.

Accordingly, the so-called lithium secondary cell, which uses a carbon material that is capable of repeating reversibly intercalation and deintercalation by charge and discharge as the negative electrode material, has been proposed, is now being intensively researched and developed, and is already put in actual use. In this lithium secondary cell, so far as it is not overcharged, active dendritic metal lithium crystals do not precipitate on the negative electrode surface when the cell is charging up and discharging, and enhancement of safety is much expected. Moreover, since this battery is extremely superior in high rate charge and discharge characteristics and cycle life to the lithium secondary cell using metal lithium in the negative electrode active material, the demand for this battery is growing rapidly in recent years.

As the positive electrode active material for lithium ion secondary cell of 4V class, a composite oxide of lithium and transition metal, such as $LiCoO_2$, $LiNiO_2$, $LiMnO_2$, and $LiMn_2O_4$, corresponding to the discharge state is being employed or considered. As the electrolyte, similarly as in the lithium secondary cell, a nonaqueous electrolyte such as organic electrolyte and polymer solid electrolyte is used.

When graphite is used in the negative electrode material, the theoretical value of capacity per 1 g of carbon by reference to $C_6Li$ of interlayer compound produced by intercalation of lithium ion is 372 mAh. Therefore, among various carbon materials, the one which helps realize a specific capacity close to this theoretical value, as well as causes the capacity per unit volume, i.e., capacity density (mAh/cc) to be as high as possible, should be selected for the negative electrode that is put in practical use.

Among various carbon materials, in the hardly graphitized carbon generally known as hard carbon, materials which exhibit a specific capacity exceeding the above mentioned theoretical value (372 mAh/g) are discovered and are being investigated. However, since the hardly graphitized amorphous carbon is small in true specific gravity and is bulky, it is substantially difficult to increase the capacity density per unit volume of the negative electrode. Furthermore, there still remain many problems, for example, the negative electrode potential after charge is not so base as to be close to the metal lithium potential, and flatness of discharge potential is inferior.

By contrast, when natural graphite or artificial graphite powder which is high in crystallinity is used in the negative electrode, the potential after charge is close to the metal lithium potential, and the flatness of discharge potential is excellent, whereby the charge and discharge characteristics are enhanced as a practical battery, and thus the graphite powder is recently becoming the mainstream of negative electrode material.

However, when the mean particle size of the graphite powder for negative electrode of a lithium ion secondary cell is large, the charge and discharge characteristics at high rate and discharge characteristic at low temperature tend to be inferior. Accordingly, by reducing the mean particle size of the powder, the high rate charge and discharge characteristics and low temperature discharge characteristic are enhanced, but if the mean particle size is made too small, the specific surface area of the powder becomes too large, as a result of which there is a problem of increased irreversible capacity, in which the lithium inserted by first charge in the powder cannot contribute to discharge after the first cycle. This phenomenon is not only a fatal demerit for enhancement of energy density, but also causes the solvent in the organic electrolyte to be decomposed in case the battery is left at a high temperature exceeding 100° C., which may lead to self-discharge as well as an electrolyte leak accident due to raise in the cell internal pressure, thereby lowering the reliability of the battery.

It is hence easily understood that the appropriate specific surface area and mean particle size are essential for the graphite powder for negative electrode. An invention proposed from such viewpoint is, for example, Japanese Laid-open Patent No. 6-295725, which uses graphite powder of which specific surface area by BET method is 1 to 10 $m^2/g$, mean particle size is 10 to 30 microns, and at least one of the content of powder with a particle size of 10 microns or less and the content of powder with a particle size of 30 microns or more is 10% or less. Further, in Japanese Laid-open Patent No. 7-134988, the usage of spherical graphite powder is disclosed, which is obtained by graphitizing meso-carbon micro-beads formed by heating petroleum pitch at a low temperature and of which plane interval (d002) of (002) plane by wide angle X-ray diffraction method is 3.36 to 3.40 angstroms, and specific surface area by BET method is 0.7 to 5.0 $m^2/g$.

These inventions were not only extremely effective for enhancement of high rate charge and discharge characteristics and discharge characteristic at low temperature of the lithium ion secondary cell, but also effective for decreasing the irreversible capacity determined in the initial phase of cycle, which was a fatal problem to be solved. However, such problems are still left that storage property and reliability when left at a high temperature are not sufficiently achieved, and the specific capacity (mAh/g) and capacity density (mAh/cc) of the negative electrode are not satisfactory.

It is thus an object of the invention to further improve the reliability and high energy density of a lithium secondary cell.

DISCLOSURE OF INVENTION

To solve the aforesaid problems of the lithium ion secondary cell, according to the present invention, flaky or lumpy graphite particles of high purity (fixed carbon content 98% or more) and of high crystallinity with a mean particle size of 20 microns or more and a mean thickness of 15 microns or more are dispersed in liquid or gas; this liquid or gas is pressurized and discharged spirally from the nozzle, thereby pulverizing the graphite particles; and they are sifted, by which the tapping density, X-ray diffraction peak intensity ratio of (110)/(004) by wide angle X-ray diffraction method, and particle shape of the graphite powder are controlled, whereby a nonaqueous electrolyte secondary cell of high specific capacity is realized, wherein the irreversible capacity noted in the initial cycle is kept as small as possible, the storage property and reliability of the battery when left at a high temperature are enhanced, and excellent high rate discharge characteristic and discharge characteristic at a low temperature are achieved.

BEST MODES FOR CARRYING OUT THE INVENTION

Figure 1:
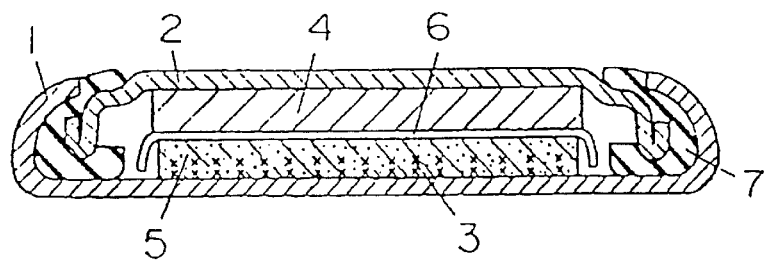
FIG. 1 is a sectional view of a coin type cell for measuring the reversible capacity and irreversible capacity for studying the effects achieved by the invention.

The present invention as set forth in claim 1 relates to a nonaqueous electrolyte secondary cell comprising a positive electrode, a negative electrode, and a separator interposed therebetween, said negative electrode being made of a negative electrode material that allows lithium ions to repeat intercalation and deintercalation reversibly by charge and discharge, wherein a graphite powder used in said negative electrode material is prepared such that flaky or lumpy graphite particles, of which plane interval (d002) of (002) plane by wide angle X-ray diffraction method is 3.350 to 3.360 angstroms, and crystallite size (Lc) in a C-axis direction is at least 1000 angstroms or more, are chamfered into substantially disk or tablet form through pulverization, and are then sifted, so that a mean particle size of the graphite particles is defined to be 10 to 30 micros, a mean thickness of the thinnest portion thereof is defined to be 3 to 9 microns, and an X-ray diffraction peak intensity ratio of (110)/(004) thereof by a wide anale X-ray diffraction method is defined to be 0.015 or more, by which various characteristics of the lithium secondary cell are improved and a high energy density is achieved.

The invention as set forth in claims 2 to 6 relate to the graphite powder for the negative electrode cited in claim 1, in which the above object is achieved more securely by defining the specific surface area by BET method at 2.0 to 8.0 m$^2$/g, and the tapping density at 0.6 to 1.2 g/cc, and in particular, by controlling the content of the powder of which particle size is less than 5 microns and of the powder of which particle size is over 50 microns.

The invention as set forth in claim 7 relates to the nonaqueous electrolyte secondary cell cited in claim 1, in which a transition metal oxide containing lithium (chemical formula Li$_x$MO$_2$, where M is one or more transition metals selected from Co, Ni, Mn, and Fe, and x=0 or more and 1.2 or less) is used in the positive electrode active material, whereby the lithium ion secondary cell which exhibits excellent safety properties and high rate charge and discharge characteristics is presented. The positive electrode active material is particularly preferred to be Li$_x$CoO$_2$, Li$_x$NiO$_2$Li$_x$Mn$_2$O$_4$, and those having a part of Co, Ni, Mn replaced by other transition metal or element.

The invention as set forth in claim 8 relates to a manufacturing method of a negative electrode for a nonaqueous electrolyte secondary cell characterized in that the negative electrode is formed with the use of a graphite powder of substantially disk or tablet form, said graphite powder being prepared by dispersing flaky or lumpy graphite particles, of which plane interval (d002) of (002) plane by wide angle X-ray diffraction method is 3.350 to 3.360 angstroms, crystallite size (Lc) in the C-axis direction is at least 1000 angstroms or more, mean particle size is 20 microns or more, and mean thickness of the thinnest portion is 15 microns or more, in liquid or gas; pressurizing and discharging the liquid or gas spirally from a nozzle, by which the graphite particles are pulverized; and sifting the graphite powder into particles of the disk- or tablet-like form. The method of the invention may be implemented either by a wet process or a dry process. In the case of wet process where graphite particles are dispersed in liquid and pulverized, thereby obtaining disk- or tablet-like graphite particles, the graphite concentration in the liquid may preferably be set at 5 to 30 wt %, and more preferably 15 to 25 wt %. The nozzle diameter is preferred to be 0.3 to 3 mm, and more preferably 0.6 to 1.2 mm. Furthermore, the discharge pressure is preferred to be 100 to 1000 kg/cm$^2$, and more preferably 400 to 700 kg/cm$^2$.

In the case of dry process where graphite particle are dispersed in gas and pulverized, thereby obtaining disk- or tablet-like graphite particles, the graphite concentration in the gas is preferred to be 10 to 60 kg/m$^3$. The nozzle diameter is preferred to be 3 to 35 mm, and more preferably 15 to 25 mm. Moreover, the discharge pressure is preferred to be 0.3 to 10 kg/cm$^2$, and more preferably 0.5 to 3 kg/cm$^2$.

Water, ethanol, methanol or the like may be suitably employed for the solvent to be used in the wet process of the invention. Air, nitrogen, argon or the like may be preferably employed as the gas to be used in the dry process.

In the above conditions, disk- or tablet-like graphite particles can be obtained efficiently by pulverizing the graphite particles while the liquid or gas is pressurized and discharged spirally from the nozzle, thereby creating a vortex in a crushing container.

In both of the wet process and the dry process of the invention, pulverization is not promoted sufficiently and it is hard to obtain disk- or tablet-like graphite particles with a concentration higher than the specified range of concentration, while productivity is lowered with a concentration lower than the specified range.

Also, if the nozzle diameter is larger than the specified nozzle diameter range, the grinding efficiency decreases to lower the productivity, while if the nozzle diameter is smaller than the defined range, grinding is promoted excessively and it is hard to obtain disk- or tablet-like graphite particles.

Further, if the discharge pressure is smaller than the specified discharge pressure range, grinding is not promoted and productivity is lowered, while if the pressure is larger, to the contrary, grinding is promoted excessively and it is hard to obtain disk- or tablet-like graphite particles.

The electrolyte is not limited to a particular type in this invention. Any of electrolytic solution, polymer electrolyte, or combinations thereof may be used. It is, however, preferable that the solvent of the electrolytic solution used in the battery comprising the 4V class positive electrode cited in claim 7 and the negative electrode of the invention is mainly composed of a mixed solvent of one kind or more of cyclic carbonate such as ethylene carbonate, propylene carbonate, and butylene carbonate that are excellent in oxidation resistance and low temperature characteristics, and one kind or more of chain carbonate such as dimethyl carbonate, diethyl carbonate, and ethyl methyl carbonate, Other solvents, such as aliphatic carboxylate ester or ethers may be also mixed as required. The mixing ratio by volume of cyclic carbonate and of chain carbonate in relation to the entire solution should preferably be within the range of 5 to 50% and 10 to 90%, respectively, and in particular, 15 to 40% and 20 to 80%, respectively.

Incidentally, in case of using a material of relatively low potential of 3V class or the like for the positive electrode, solvents other than those mentioned above may be also used.

Lithium salt is used as the solute for such solvents. Well-known examples of lithium salt include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $Li(CF_3SO_2)_2$, $LiAsF_6$, $LiN(CF_3SO_2)_2$, etc.

No restrictions are placed on selection of members necessary for constituting the battery other than those mentioned above.

EMBODIMENTS

Referring now to the drawings and tables, preferred embodiments of the invention will be hereinafter described in detail.

Basic Experiment

FIG. 1 is a sectional view of a coin type cell for measuring the reversible capacity and irreversible capacity of a carbon material for the negative electrode of a lithium ion secondary cell. In FIG. 1, a grid 3 of stainless steel expanded metal is preliminarily spot-welded to the inner bottom of a stainless steel cell case 1, and this grid 3 and a compound mainly composed of the carbon powder for negative electrode of lithium ion secondary cell are integrally fixed as a carbon electrode 5 by an internal forming method. The compound of the carbon electrode 5 is a mixture of a sample carbon powder and an acrylic binder at a ratio of 100:5 by weight. A polypropylene gasket 7 is fitted to the brim of a stainless steel lid 2, and metal lithium 4 is pressed to the inner surface of the lid 2. After injecting and impregnating nonaqueous electrolyte to the carbon electrode 5, the lid 2 with the gasket 7 is coupled to the cell case 1 through a separator 6 of micro-porous polyethylene film, and the upper edge opening of the cell case 1 is curled inwardly and sealed. As the nonaqueous electrolyte, an organic electrode prepared by mixing ethylene carbonate and diethyl carbonate at a ratio of 1:1 by volume, and dissolving lithium hexafluorophosphate in this mixed solvent at a concentration of 1 mol/liter was employed. Cells were fabricated using 29 kinds of sample carbon powder in the carbon electrode 5, and using the carbon electrode 5 as the positive electrode and the metal lithium electrode 4 as the negative electrode, charging and discharging were repeated at constant current of current density of 0.3 $mA/cm^2$ at 20° C. After intercalating lithium in carbon until the cell voltage becomes 0V, lithium is deintercalated from carbon until the cell voltage becomes 1.0V, and the determined capacity is the reversible capacity. The value obtained by subtracting the reversible capacity from the quantity of electricity required for intercalation is defined to be the irreversible capacity. The charge and discharge end voltages of these test cells nearly correspond to the charge end voltage of 4.20V and discharge end voltage of 2.75V of a commercial cell of carbon negative electrode and $LiCoO_2$ positive electrode.

Graphite powder of which mean particle size is defined is prepared as sample carbon powder for negative electrode (sample Nos. 12 to 29), by pulverizing and sifting flaky natural graphite (mean particle size of about 50 microns, mean thickness of thinnest portion of about 25 microns) or lumpy natural graphite (mean particle size of about 50 microns, mean thickness of thinnest portion of about 30 microns), and flaky artificial graphite particles (mean particle size of about 50 microns, mean thickness of thinnest portion of about 30 microns) that are obtained by a conventional grinding method, in the conditions of the present invention shown in Table 2 or Table 3. The properties of these powder materials, and the aforesaid reversible capacity and irreversible capacity are summarized in Table 2 and Table 3. As comparative samples, flaky or lumpy natural graphite that is obtained by a conventional grinding method, artificial graphite particles pulverized by a conventional impact grinder such as a ball mill, a jet mill, a hammer mill or a pin mill (sample Nos. 1 to 9), spherical meso-carbon micro-beads (MCMB, sample No. 10) obtained by graphitizing meso-carbon micro-beads as disclosed in Japanese Laid-open Patent No. 7-134988, and petroleum pitch coke powder (sample No. 11) were used as sample carbon powder materials for negative electrode. The properties of these powder materials as well as the reversible capacity and irreversible capacity are summarized in Table 1.

The tapping density of sample carbon powder materials was measured by means of Powder Tester of Hosokawa Micron. The mean particle size was obtained with the use of LA-910 of Horiba, by emitting a laser beam to target particles and analyzing the light diffraction phenomenon (scatter). The specific surface area was measured by the BET multi-point method using ASAP2010 of Shimadzu. The mean thickness of carbon powder was determined, after pressing and forming each of the sample graphite powder materials with a die and cutting the formed materials in parallel to the pressing direction, from an SEM image of this sectional surface. That is, the value in the thickness direction of the thinnest portion of carbon powder was measured in more than 100 pieces, and the mean was determined.

The X-ray peak intensity ratio of (110)/(004) was obtained such that the carbon powder was pressed with a die to form pellets of density of about 1.7 g/cc, the peak intensity of (110) and (004) planes obtained by wide angle X-ray diffraction measurement were measured at five points, the peak intensity ratio of (110)/(004) was calculated, and the mean thereof was determined.

Diffraction beams on the (004) plane and (110) plane are diffraction beams on six-carbon ring reticular plane and its vertical plane of graphite crystal. When flaky-shape particles are contained in a great quantity, graphite particles are oriented selectively in the direction parallel to the pressing plane when making pellets, as compared to the case where there are many graphite particles of disk or tablet shape. Therefore, when the ratio of flaky particles increases in relation to the disk- or tablet-like graphite particles, the X-ray peak intensity ratio of (110)/(004) decreases.

TABLE 1

| | | | | | | Powder properties | | | | | Electric characteristics | |
|---|---|---|---|---|---|---|---|---|---|---|---|---|
| Sample No. | Material | Manu-facturer | Trade-name | d002 (Å) | Lc (Å) | Mean particle size (μm) | Specific surface area (m²/g) | Mean thickness of thinnest portion (μm) | Tapping density (g/cc) | (110)/(004) | Reversible capacity (mAh/g) | Irreversible capacity (mAh/g) |
| 1 | Artificial graphite | Timcal | KS15 | 3.359 | 1000 or more | 10.1 | 12.1 | 1.1 | 0.21 | 0.008 | 351 | 53 |
| 2 | Artificial graphite | Timcal | KS25 | 3.357 | 1000 or more | 12.5 | 10.5 | 1.3 | 0.35 | 0.009 | 353 | 43 |
| 3 | Artificial graphite | Timcal | KS44 | 3.355 | 1000 or more | 18.4 | 8.3 | 1.8 | 0.41 | 0.010 | 359 | 36 |
| 4 | Artificial graphite | Timcal | KS75 | 3.356 | 1000 or more | 25.3 | 5.2 | 2.1 | 0.44 | 0.011 | 353 | 25 |
| 5 | Artificial graphite | Nippon Graphite | SP-10 | 3.354 | 1000 or more | 32.9 | 7.1 | 2.4 | 0.43 | 0.012 | 353 | 32 |
| 6 | Artificial graphite | Nippon Graphite | SP-20 | 3.355 | 1000 or more | 15.1 | 8.9 | 1.8 | 0.25 | 0.010 | 356 | 40 |
| 7 | Natural graphite | SEC | SNO10 | 3.353 | 1000 or more | 10.5 | 9.0 | 2.0 | 0.42 | 0.008 | 362 | 39 |
| 8 | Natural graphite | SEC | SNO15 | 3.352 | 1000 or more | 13.2 | 8.1 | 2.3 | 0.45 | 0.009 | 361 | 35 |
| 9 | Natural graphite | SEC | SNO20 | 3.355 | 1000 or more | 18.7 | 7.3 | 2.5 | 0.46 | 0.009 | 358 | 34 |
| 10 | Meso-phase | Osaka Gas | MCMB | 3.367 | 700 | 5.3 | 2.9 | 5.3 | 1.20 | 0.120 | 295 | 18 |
| 11 | Coke | Nippon Graphite | GMW-20NB | 3.365 | 750 | 17.5 | 5.5 | 8.1 | 0.95 | 0.110 | 298 | 27 |

TABLE 2

| | | | | Manufacturing condition (wet process, solvent:water) | | | Powder properties | | | | | | | Electric characteristics | |
|---|---|---|---|---|---|---|---|---|---|---|---|---|---|---|---|
| Sample No. | Material | Manu-facturer | Trade-name | Nozzle diameter (mm) | Graphite concentration (wt %) | Discharge pressure (kg/cm²) | d002 (Å) | Lc (Å) | Mean particle size (μm) | Specific surface area (m²/g) | Mean thickness of thinnest portion (μm) | Tapping density (g/cc) | (110)/(004) | Reversible capacity (mAh/g) | Irreversible capacity (mAh/g) |
| 12 | Natural graphite | Nippon Graphite | ACP-10NB | 0.6 | 20 | 700 | 3.355 | 1000 or more | 10.3 | 7.2 | 3.1 | 0.61 | 0.030 | 356 | 30 |
| 13 | Natural graphite | Nippon Gaphite | ACP-20NB | 0.6 | 20 | 400 | 3.356 | 1000 or more | 19.1 | 4.7 | 5.4 | 0.76 | 0.038 | 354 | 23 |
| 14 | Natural graphite | Nippon Gaphite | ACP-15NB | 0.6 | 20 | 600 | 3.356 | 1000 or more | 15.2 | 5.5 | 4.5 | 0.70 | 0.035 | 354 | 25 |
| 15 | Natural graphite | Nippon Gaphite | ASP-25NB | 0.8 | 15 | 550 | 3.357 | 1000 or more | 21.3 | 3.0 | 7.0 | 1.05 | 0.043 | 355 | 19 |
| 16 | Natural graphite | Nippon Gaphite | ASP-20NB | 0.8 | 15 | 700 | 3.358 | 1000 or more | 16.5 | 3.5 | 6.3 | 0.92 | 0.039 | 357 | 20 |
| 17 | Natural graphite | Nippon Gaphite | ASP-30NB | 0.8 | 15 | 400 | 3.358 | 1000 or more | 29.5 | 2.1 | 8.9 | 1.15 | 0.048 | 354 | 17 |
| 18 | Artificial graphite | Nippon Gaphite | SP-30NB | 1.0 | 25 | 400 | 3.358 | 1000 or more | 25.5 | 4.1 | 6.0 | 0.85 | 0.038 | 353 | 22 |
| 19 | Artificial graphite | Nippon Gaphite | SP-20NB | 1.0 | 25 | 700 | 3.357 | 1000 or more | 15.9 | 5.7 | 3.5 | 0.61 | 0.032 | 360 | 25 |
| 20 | Artificial graphite | Nippon Gaphite | SP-25NB | 1.0 | 25 | 500 | 3.358 | 1000 or more | 20.8 | 4.8 | 5.2 | 0.73 | 0.036 | 357 | 24 |

TABLE 3

| | | | | Manufacturing condition | | | Powder properties | | | | | | Electric characteristics | |
| | | | | (dry process, gas:air) | | | | | | Mean | Mean | Tap- | | | Rever- | Irre- |
| Sample No. | Material | Manufacturer | Trade-name | Nozzle diameter (mm) | Graphite concentration (wt %) | Discharge pressure (kg/cm$^2$) | d002 (Å) | Lc (Å) | particle size ($\mu$m) | Specific surface area (m$^2$/g) | thickness of thinnest portion ($\mu$m) | ping density (g/cc) | (110)/ (004) | sible capacity (mAh/g) | versible capacity (mAh/g) |
|---|---|---|---|---|---|---|---|---|---|---|---|---|---|---|---|
| 21 | Natural graphite | Nippon Gaphite | ACP-15NB | 15 | 40 | 2.5 | 3.356 | 1000 or more | 15.3 | 6.0 | 4.4 | 0.69 | 0.033 | 354 | 27 |
| 22 | Natural graphite | Nippon Gaphite | ACP-20NB | 15 | 40 | 1.5 | 3.356 | 1000 or more | 20.2 | 5.2 | 5.4 | 0.75 | 0.035 | 352 | 24 |
| 23 | Natural graphite | Nippon Gaphite | ACP-30NB | 15 | 40 | 0.5 | 3.357 | 1000 or more | 29.2 | 4.7 | 7.0 | 0.85 | 0.040 | 351 | 23 |
| 24 | Natural graphite | Nippon Gaphite | ASP-15NB | 25 | 30 | 3.0 | 3.357 | 1000 or more | 16.7 | 7.4 | 6.2 | 0.89 | 0.038 | 355 | 30 |
| 25 | Natural graphite | Nippon Gaphite | ASP-20NB | 25 | 30 | 2.0 | 3.359 | 1000 or more | 20.4 | 6.4 | 6.9 | 1.01 | 0.042 | 353 | 27 |
| 26 | Natural graphite | Nippon Gaphite | ASP-25NB | 25 | 30 | 1.0 | 3.358 | 1000 or more | 25.0 | 6.1 | 7.8 | 1.05 | 0.048 | 352 | 25 |
| 27 | Artificial graphite | Nippon Gaphite | SP-30NB | 20 | 20 | 1.0 | 3.359 | 1000 or more | 26.0 | 4.6 | 5.9 | 0.83 | 0.038 | 351 | 24 |
| 28 | Artificial graphite | Nippon Gaphite | SP-20NB | 20 | 20 | 3.0 | 3.357 | 1000 or more | 16.2 | 6.0 | 3.6 | 0.60 | 0.033 | 354 | 29 |
| 29 | Artificial graphite | Nippon Gaphite | SP-25NB | 20 more | 20 | 2.0 | 3.358 | 1000 or more | 20.5 | 5.1 | 5.3 | 0.72 | 0.035 | 352 | 25 |

As can be seen from Tables 1, 2, and 3, the cells with the spherical graphite powder (sample No. 10) and the coke powder (sample No. 11) in comparative samples with Lc of less than 1000 angstroms had relatively small irreversible capacities, but the reversible capacities which greatly influence the energy density were small (both less than 300 mAh/g). In contrast, all of the cells with the sample Nos. 1 to 9 and 12 to 29 made of natural graphite or artificial graphite powder had the reversible capacity of at least 350 mAh/g, which was close to the theoretical value of specific capacity (372 mAh/g). Among them, it is noted that the irreversible capacities of the cells with the sample graphite powder Nos. 12 to 29 are 17 to 30 mAh/g, that are smaller as compared to those of the cells with other sample graphite powder (Nos. 1 to 9).

It is understood that a high level reversible capacity is obtained by using natural graphite or artificial graphite of high degree of crystallinity and purity with the plane interval (d002) of (002) plane being 3.350 to 3.360 angstroms by wide angle X-ray diffraction and the crystallite size (Lc) in the C-axis direction being at least 1000 angstroms or more, in the negative electrode material of lithium ion secondary cell, as the preliminary conditions of the present invention.

Embodiments and Comparative Examples

Using the same carbon powder materials for negative electrode (sample Nos. 1 to 29) of which reversible capacity and irreversible capacity were determined in the basic experiment, cylindrical cells were fabricated, and the high rate discharge characteristic at a low temperature and electrolyte leak possibility when left at a high temperature in a charged state were investigated.

Figure 2:
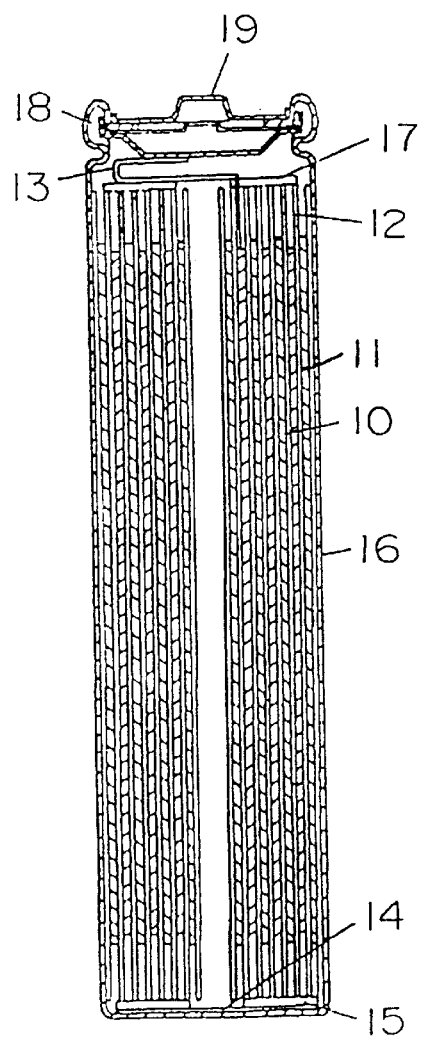
FIG. 2 is a sectional view of a cylindrical cell in a vortex electrode group constitution according to an embodiment of the invention.

FIG. 2 is a sectional view of a cylindrical cell of spiral electrode group configuration. In FIG. 2, a band-like positive electrode 10 and a negative electrode 11 are spirally wound with a separator 12 made of micro-porous polyethylene film interposed therebetween, thereby constituting an electrode group. The positive electrode 10 is prepared by mixing LiCoO$_2$ which is a composite oxide of lithium and cobalt of active materials, carbon black as conductive material, and polytetrafluoroethylene (PTFE) as a binder at a ratio of 100:3:10 by weight, applying this paste on both sides of an aluminum foil used as a current collector, drying and pressing it by a roll, and cutting it to a prescribed size. A dispersion solution was used for the PTFE as the binder. A positive electrode lead piece 13 is spot-welded to the aluminum foil of the positive electrode 10. The negative electrode 11 is prepared by applying a paste, that is obtained by admixing an acrylic binder solution into the sample carbon powder, on both sides of a copper foil used as a current collector, drying and pressing it by a roll, and cutting it to a prescribed size. A negative electrode lead piece 14 is spot-welded to the copper foil of the negative electrode 11. A bottom insulator 15 is mounted on the lower side of the wound electrode group, which is then put into a cell case 16 made of a nickel plated steel plate, and the negative electrode lead piece 14 is spot-welded to the inner bottom of the cell case 16. Then, after placing an upper insulator 17 on the electrode group, a groove is cut in a prescribed position at the opening of the cell case 16, and a predetermined amount of organic electrolyte is injected thereinto and impregnated. As the organic electrolyte, the same kind as used in the basic experiment was used. Afterwards, the positive electrode lead piece 13 is spot-welded to the inner bottom of a seal plate 19 to which a gasket 18 has been fitted at its peripheral edge. The seal plate 19 is then fitted to the opening of the cell case 16 through the gasket 18, and the upper edge of the cell case 16 is curled inwardly and sealed, thereby completing a cell.

The discharge capacity of each cell was set such as to be defined by the negative electrode capacity, and the weight of carbon powder for negative electrode of each cell was made identical regardless of the kind. The amount of other materials and manufacturing method were made identical, so that the comparison could be made with respect to the carbon powder materials for negative electrode.

All of the cells, five cells each for cells a to k and A to R, that are respectively made of 29 kinds of carbon powder for negative electrode, were charged at 20° C. at a constant current of 100 mA (1/5C) until the terminal voltage of each cell became 4.2 V, after which they were discharged at a constant current of 100 mA (1/5C) until 2.75V, and the 1/5C discharge capacity was determined. Then, after charging the cells in a similar manner, they were discharged at a constant current of 500 mA (1C) until 2.75V, and the 1C discharge capacity was determined. Successively, the cells were charged at 20° C., after which they were left at −20° C. for 24 hours, and the 1C discharge capacity was determined at the same temperature of −20° C. Further, after letting each of the cells stand at 20° C., when the temperature of the cells had returned to 20° C., they were charged in a similar manner, and then the cells were left at 100° C. for one day, and after the cell temperature had returned to 20° C., all cells were observed for presence or absence of electrolyte leak.

The above mentioned battery performances (mean of five cells) are summarized in Table 4 in contrast to the properties of the sample carbon powder materials.

TABLE 4

| | | | | | | Powder properties | | | | | | Battery performance | | | |
|---|---|---|---|---|---|---|---|---|---|---|---|---|---|---|---|
| Sample No. | Material | Manufacturer | Tradename | d002 (Å) | Lc (Å) | Mean particle size (μm) | Specific surface area (m²/g) | Mean thickness of thinnest portion (μm) | Tapping density (g/cc) | (110)/(004) | Cell No | 1/5C discharge capacity (mAh) | 1C discharge capacity (mAh) | −20° C. 1C discharge capacity (mAh) | Number of electrolyte leak after being left at high temperature |
| 1 | Artificial graphite | Timcal | KS15 | 3.359 | 1000 or more | 10.1 | 12.1 | 1.1 | 0.21 | 0.008 | a | 511 | 501 | 450 | 5/5 |
| 2 | Artificial graphite | " | KS25 | 3.357 | 1000 or more | 12.5 | 10.5 | 1.3 | 0.35 | 0.009 | b | 532 | 523 | 452 | 3/5 |
| 3 | Artificial graphite | " | KS44 | 3.355 | 1000 or more | 18.4 | 8.3 | 1.8 | 0.41 | 0.010 | c | 539 | 521 | 410 | 2/5 |
| 4 | Artificial graphite | " | KS75 | 3.356 | 1000 or more | 25.3 | 5.2 | 2.1 | 0.44 | 0.011 | d | 549 | 508 | 357 | 0/5 |
| 5 | Artificial graphite | Nippon Graphite | SP-10 | 3.354 | 1000 or more | 32.9 | 7.1 | 2.4 | 0.43 | 0.012 | e | 537 | 483 | 267 | 1/5 |
| 6 | Artificial graphite | Nippon Graphite | SP-20 | 3.355 | 1000 or more | 15.1 | 8.9 | 1.8 | 0.25 | 0.010 | f | 541 | 528 | 433 | 2/5 |
| 7 | Natural graphite | SEC | SNO10 | 3.353 | 1000 or more | 10.5 | 9.0 | 2.0 | 0.42 | 0.008 | g | 538 | 522 | 473 | 3/5 |
| 8 | Natural graphite | " | SNO15 | 3.352 | 1000 or more | 13.2 | 8.1 | 2.3 | 0.45 | 0.009 | h | 545 | 531 | 452 | 2/5 |
| 9 | Natural graphite | " | SNO20 | 3.355 | 1000 or more | 18.7 | 7.3 | 2.5 | 0.46 | 0.009 | i | 536 | 520 | 407 | 1/5 |
| 10 | Mesophase | Osaka Gas | MCMB | 3.367 | 700 | 5.3 | 2.9 | 5.3 | 1.20 | 0.120 | j | 478 | 463 | 417 | 0/5 |
| 11 | Coke | Nippon Graphite | GMW-20NB | 3.365 | 750 | 17.5 | 5.5 | 8.1 | 0.95 | 0.110 | k | 483 | 468 | 372 | 0/5 |
| 12 | Natural graphite | Nippon Graphite | ACP-10NB | 3.355 | 1000 or more | 10.3 | 7.2 | 3.1 | 0.61 | 0.030 | A | 538 | 527 | 416 | 0/5 |
| 13 | Natural graphite | Nippon Graphite | ACP-20NB | 3.356 | 1000 or more | 19.1 | 4.7 | 5.4 | 0.76 | 0.038 | B | 554 | 543 | 421 | 0/5 |
| 14 | Natural graphite | Nippon Graphite | ACP-15NB | 3.356 | 1000 or more | 15.2 | 5.5 | 4.5 | 0.70 | 0.035 | C | 552 | 541 | 417 | 0/5 |
| 15 | Natural graphite | Nippon Graphite | ASP-25NB | 3.357 | 1000 or more | 21.3 | 3.0 | 7.0 | 1.05 | 0.0425 | D | 560 | 549 | 440 | 0/5 |
| 16 | Natural graphite | Nippon Graphite | ASP-20NB | 3.358 | 1000 or more | 16.5 | 3.5 | 6.3 | 0.92 | 0.039 | E | 561 | 550 | 445 | 0/5 |
| 17 | Natural graphite | Nippon Graphite | ASP-30NB | 3.358 | 1000 or more | 29.5 | 2.1 | 8.9 | 1.15 | 0.048 | F | 565 | 551 | 441 | 0/5 |
| 18 | Artificial graphite | Nippon Graphite | SP-30NB | 3.358 | 1000 or more | 25.5 | 4.1 | 6.0 | 0.85 | 0.038 | G | 560 | 546 | 431 | 0/5 |
| 19 | Artificial graphite | Nippon Graphite | SP-20NB | 3.357 | 1000 or more | 15.9 | 5.7 | 3.5 | 0.61 | 0.032 | H | 557 | 546 | 440 | 0/5 |
| 20 | Artificial graphite | Nippon Graphite | SP-25NB | 3.358 | 1000 or more | 20.8 | 4.8 | 5.2 | 0.73 | 0.036 | I | 558 | 547 | 438 | 0/5 |
| 21 | Natural | Nippon | ACP-15NB | 3.356 | 1000 or more | 15.3 | 6.0 | 4.4 | 0.69 | 0.033 | J | 550 | 539 | 420 | 0/5 |

TABLE 4-continued

| | | | | | | | | Powder properties | | | | | Battery performance | | | |
|---|---|---|---|---|---|---|---|---|---|---|---|---|---|---|---|---|
| Sample No. | Material | Manufacturer | Trade-name | d002 (Å) | Lc (Å) | Mean particle size (μm) | Specific surface area (m²/g) | Mean thickness of thinnest portion (μm) | Tapping density (g/cc) | (110)/ (004) | Cell No | 1/5C discharge capacity (mAh) | 1C discharge capacity (mAh) | -20° C. 1C discharge capacity (mAh) | Number of electrolyte leak after being left at high temperature |
| 22 | Natural graphite | Nippon Graphite | ACP-20NB | 3.356 | 1000 or more | 20.2 | 5.2 | 5.4 | 0.75 | 0.035 | K | 554 | 540 | 419 | 0/5 |
| 23 | Natural graphite | Nippon Graphite | ACP-30NB | 3357 | 1000 or more | 29.2 | 4.7 | 7.0 | 0.85 | 0.040 | L | 558 | 541 | 417 | 0/5 |
| 24 | Natural graphite | Nippon Graphite | ASP-15NB | 3357 | 1000 or more | 16.7 | 7.4 | 6.2 | 0.89 | 0.038 | M | 541 | 533 | 437 | 0/5 |
| 25 | Natural graphite | Nippon Graphite | ASP-20NB | 3359 | 1000 or more | 20.4 | 6.4 | 6.9 | 1.01 | 0.042 | N | 555 | 547 | 443 | 0/5 |
| 26 | Natural graphite | Nippon Graphite | ASP-25NB | 3.358 | 1000 or more | 25.0 | 6.1 | 7.8 | 1.05 | 0.048 | O | 560 | 549 | 439 | 0/5 |
| 27 | Artificial graphite | Nippon Graphite | SP-30NB | 3.359 | 1000 or more | 26.0 | 4.6 | 5.9 | 0.83 | 0.038 | P | 545 | 534 | 422 | 0/5 |
| 28 | Artificial graphite | Nippon Graphite | SP-20NB | 3357 | 1000 or more | 16.2 | 6.0 | 3.6 | 0.60 | 0.033 | Q | 540 | 530 | 427 | 0/5 |
| 29 | Artificial graphite | Nippon Graphite | SP-25NB | 3.358 | 1000 or more | 20.5 | 5.1 | 5.3 | 0.72 | 0.035 | R | 543 | 532 | 428 | 0/5 |

As can be seen from Table 4, the cells with sample Nos. 10 and 11 which had small reversible capacities as shown in Table 1, have small 1/5C and 1C discharge capacities at 20° C., while those of the cells with the sample graphite powder Nos. 1 to 9 are relatively large. However, those which exhibited high rate discharge capacities at low temperature (−20° C., 1C) of 415 mA or more were the cells a, b, f, g, h, j, and A to R only, that were respectively made of the sample graphite powder Nos. 1, 2, 6, 7, 8, 10, and 12 to 29. Further, those which were completely free from electrolyte leak after being left at a high temperature were the cells d, j, k and A to R, that were respectively made of the sample graphite powder Nos. 4, and 10 to 29. From these results, it is seen that those which were excellent in all of the battery performances were the cells A to R that were respectively made of the sample graphite powder Nos. 12 to 29 of the present invention.

Of the properties of the sample graphite powder of Nos. 12 to 29, a great difference lies in the points that the tapping density is as high as 0.60–1.15g/cc as compared to 0.21–0.46 g/cc of the other graphite powder (sample Nos. 1 to 9), and that the X-ray diffraction peak intensity of (110)/(004) by wide angle X-ray diffraction method exceeds 0.015. This is due to the facts that the mean particle size of graphite powder of Nos. 12 to 29 is 10.3 to 29.5 microns, as well as the specific surface area by BET method is 2.1 to 7.4 m²/g, which means that the specific surface area is not too large for the mean particle size, and that the mean thickness of sample graphite powder Nos. 12 to 29 is 3.1 to 8.9 microns, that is larger than 1.1 to 2.5 microns of other graphite powder materials (sample Nos. 1 to 9). More specifically, the graphite powder of the present invention is prepared such that flaky or lumpy graphite particles of high degree of crystallinity and purity are dispersed in liquid or gas, this liquid or gas is pressurized and discharged spirally from a nozzle, thereby forming a vortex flow and pulverizing the graphite powder, so as to chamfer the graphite powder into disk- or tablet-like particles, and the graphite powder is then sifted into a powder of prescribed particle size, by which the tapping density is high and the X-ray diffraction peak intensity ratio of (110)/(004) by wide angle X-ray diffraction method is large. Therefore, the high rate charge and discharge performances and high rate discharge performance at a low temperature are enhanced by using a graphite powder of a desired mean particle size distribution through appropriate pulverizing and sifting of the graphite powder. Even after the graphite powder is pulverized, the specific surface area is not increased unnecessarily, since the particles of which thickness is large and of which shape is closer to spherical form among flaky particles are collected, by which the organic solvent in the electrolyte is hardly decomposed even at a high temperature, and the cell internal pressure is hardly raised, as a result of which the occurrence of electrolyte leak accidents is eliminated.

In the prior arts, the carbon material for the negative electrode of a lithium ion secondary cell, in particular, the graphite powder was controlled only by the mean particle size and specific surface area, but the importance of defining the graphite powder by the tapping density will be understood. Besides, as a result of experiments other than those described above, it has been found that the appropriate ranges of the mean particle size, mean thickness of thinnest portion, and X-ray diffraction peak intensity ratio of (110)/(004) by wide angle X-ray diffraction method for the graphite powder according to the present invention are 10 to 30 microns, 3 to 9 microns, and 0.015 or more, respectively. It is also confirmed that under these conditions, the specific surface area by BET method is 2.0 to 8.0 m²/g, and the defining range of the tapping density is 0.6 to 1.2 g/cc. Further, it is confirmed that the powder that is so fine, as fine as less than 5 microns in particle diameter, that it lowers the reliability after being left at a high temperature, should be contained in an amount of 15% or less, and that the powder which exceeds 50 microns in diameter and impedes the high rate discharge performance should be contained in an amount of 30% or less.

INDUSTRIAL APPLICABILITY

As set forth above, the graphite powder for negative electrode according to the present invention achieves the capacity of 351 to 360 mAh/g, that is at least 94% (94.4 to 96.8%) of a theoretical value of specific capacity (372 mAh/g), while its irreversible capacity is as extremely small as 17 to 30 mAh/g, by which it contributes to enhancement of energy density. Moreover, not only exhibiting excellent high rate charge and discharge performances and low temperature high rate discharge performance, but also it presents a highly reliable lithium secondary cell which is free from electrolyte leakage accidents even left at a high temperature, wherefore it is useful in the fabrication of lithium secondary cells.

What is claimed is:

1. A nonaqueous electrolyte secondary cell comprising a positive electrode, a negative electrode, and a separator interposed therebetween, said negative electrode comprising a negative electrode material that allows lithium ions to reversibly undergo repeated intercalation and deintercalation with each charge and discharge of said nonaqueous electrolyte secondary cell, and wherein said negative electrode material comprises powdered graphite, said powdered graphite comprising particles substantially in the form of disks, and having a mean particle size of from 10 to 30 microns, a mean thickness of the thinnest portion of from 3 to 9 microns, and an X-ray diffraction peak intensity ratio of (110)/(004) that is at least 0.015.

2. The nonaqueous electrolyte secondary cell according to claim 1, wherein said graphite powder has a specific surface area of from 2.0 to 8.0 $m^2/g$ defined by a BET method.

3. The nonaqueous electrolyte secondary cell according to claim 1, wherein said graphite powder comprises 15% or less of graphite particles having a size of less than 5 microns.

4. The nonaqueous electrolyte secondary cell according to claim 1, wherein said graphite powder comprises 30% or less of graphite particles having a size of greater than 50 microns.

5. The nonaqueous electrolyte secondary cell according to claim 4, wherein said graphite powder further comprises 15% or less of graphite particles having a particle size of less than 5 microns.

6. The nonaqueous electrolyte secondary cell according to claim 1, wherein said graphite powder has a tapping density of from 0.6 to 1.2 g/cc.

7. The nonaqueous electrolyte secondary cell according to claim 1 wherein said graphite powder is prepared by:
   (a) dispersing a graphite material that comprises flaky or lumpy graphite particles having a mean particle size of 20 microns or more and a mean thickness of 15 microns or more, in liquid or gas; pressurizing and discharging the liquid or gas spirally from a nozzle, to obtain pulverized particles of said graphite material; and
   (b) sifting said pulverized graphite material particles to obtain a graphite powder comprising particles substantially in the form of disks having a mean particle size of from 10 to 30 microns, a mean thickness of the thinnest portion of from 3 to 9 microns and an X-ray diffraction peak intensity ratio of (110)/(004) that is at least 0.015.

8. The nonaqueous electrolyte secondary cell according to claim 7, wherein said graphite material is dispersed in a liquid, and the graphite concentration in the liquid ranges from 5 to 30 wt %, the nozzle diameter ranges from 0.3 to 3 mm, and the discharge pressure ranges from 100 to 1000 $kg/cm^2$.

9. The nonaqueous electrolyte secondary cell according to claim 8 wherein the liquid is selected from the group consisting of water, ethanol, and methanol.

10. The nonaqueous electrolyte secondary cell according to claim 8, wherein said graphite material is dispersed in a gas, and the graphite concentration in the gas ranges from 10 to 60 $kg/m^3$ the nozzle diameter ranges from 3 to 35 mm, and the discharge pressure ranges from 0.3 to 10 $kg/cm^2$.

11. The nonaqueous electrolyte secondary cell according to claim 10, wherein said gas is selected from the group consisting of air, nitrogen, and argon.

12. The nonaqueous electrolyte secondary cell according to claim 1, wherein said positive electrode comprises a transition metal oxide of the formula: $LixMO_2$, and M is one or more transition metals selected from the group consisting of Co, Ni, Mn, and Fe, and x ranges in value from 0 to 1.2.

13. A method of manufacturing a negative electrode for a nonaqueous electrolyte secondary cell, comprising mixing a graphite powder with a compatible binder and forming said mixture into a negative electrode with a desired shape, wherein said graphite powder comprises particles substantially in the form of disks, and said graphite particles have a mean particle size of from 10 to 30 microns, a mean thickness of the thinnest portion of from 3 to 9 microns, and an X-ray diffraction peak intensity ratio of (110)/(004) that is at least 0.015.

14. The method according to claim 13, wherein said graphite powder is prepared by
   (a) dispersing a graphite material that comprises flaky or lumpy graphite particles having a mean particle size of 20 microns or more and a mean thickness of 15 microns or more, in liquid or gas; pressurizing and discharging the liquid or gas spirally from a nozzle, to obtain pulverized particles of said graphite material; and
   (b) sifting said pulverized graphite material particles to obtain a graphite powder comprising particles substantially in the form of disks having a mean particle size of from 10 to 30 microns or more, a mean thickness of the thinnest portion of from 3 to 9 microns and an X-ray diffraction peak intensity ratio of (110)/(004) that is at least 0.015.

15. The method according to claim 14, wherein said graphite material is dispersed in a liquid, and the graphite concentration in the liquid ranges from 5 to 30 wt %, the nozzle diameter ranges from 0.3 to 3 mm, and the discharge pressure ranges from 100 to 1000 $kg/cm^2$.

16. The method according to claim 15, wherein the liquid is selected from the group consisting of water, ethanol, and methanol.

17. The method according to claim 14, wherein said graphite material is dispersed in a gas, and the graphite concentration in the gas ranges from 10 to 60 $kg/m^3$ the nozzle diameter ranges from 3 to 35 mm, and the discharge pressure ranges from 0.3 to 10 $kg/cm^2$.

18. The method according to claim 17, wherein said gas is selected from the group consisting of air, nitrogen, and argon.

19. A powdered graphite, the particles of which are substantially in the form of disks, with a mean particle size of from 10 to 30 microns, a mean thickness of the thinnest portion of from 3 to 9 microns, and an X-ray diffraction peak intensity ratio of (110)/(004) that is at least 0.015.

20. A negative electrode for a nonaqueous electrolyte secondary cell comprising said powdered graphite of claim 19.

* * * * *